(12) United States Patent
Keller

(10) Patent No.: US 9,151,372 B2
(45) Date of Patent: Oct. 6, 2015

(54) LINEAR MOTION DEVICE HAVING AN ANTI-TWIST SAFEGUARD, COMPRISING AN ELONGATE ANTI-FRICTION LINING

(71) Applicant: Robert Bosch GmbH, Stuttgart (DE)

(72) Inventor: Bernhard Keller, Wasserlosen (DE)

(73) Assignee: Robert Bosch GmbH, Stuttgart (DE)

( * ) Notice: Subject to any disclaimer, the term of this patent is extended or adjusted under 35 U.S.C. 154(b) by 175 days.

(21) Appl. No.: 13/656,576

(22) Filed: Oct. 19, 2012

(65) Prior Publication Data

US 2013/0098185 A1   Apr. 25, 2013

(30) Foreign Application Priority Data

Oct. 20, 2011 (DE) .......................... 10 2011 116 631

(51) Int. Cl.
| | |
|---|---|
| F16H 3/06 | (2006.01) |
| F16H 27/02 | (2006.01) |
| F16H 29/02 | (2006.01) |
| F16H 29/20 | (2006.01) |
| F16H 25/24 | (2006.01) |
| F16H 25/20 | (2006.01) |

(52) U.S. Cl.
CPC ................. *F16H 25/24* (2013.01); *F16H 25/20* (2013.01); *F16H 2025/204* (2013.01); *Y10T 74/18576* (2015.01)

(58) Field of Classification Search
CPC .............. F16H 25/20; F16H 2025/204; F16H 2025/2081; F16H 2025/2034; F16H 25/2006
USPC .......... 74/89.23, 89.32, 89.33, 89.37; 384/26, 384/42
See application file for complete search history.

(56) References Cited

U.S. PATENT DOCUMENTS 3,081,644 A    3/1963   Hudgens et al.
4,712,441 A *  12/1987  Abraham ...................... 74/89.38
(Continued)

FOREIGN PATENT DOCUMENTS

DE    80 32 409 U1    8/1981
DE    37 33 781 A1    4/1989
(Continued)

OTHER PUBLICATIONS

German Search Report corresponding to German Application No. 10 2011 116 631.2, mailed Feb. 23, 2012, (5 pages).
(Continued)

*Primary Examiner* — Justin Krause
(74) *Attorney, Agent, or Firm* — Maginot, Moore & Beck LLP

(57) ABSTRACT

A linear motion device includes a housing, an extension arm, and an anti-twist safeguard. The extension arm projects from the housing and includes a securing section. The anti-twist safeguard includes at least one separate elongate anti-friction lining, which is formed with a constant cross-sectional shape. The anti-friction lining is arranged substantially without play between the housing and the securing section of the extension arm and extends transversely to a longitudinal axis. The extension arm is supported on the housing in such a way that it can move along the longitudinal axis. In the securing section, the extension arm extends parallel to the longitudinal axis with a constant external cross-sectional shape deviating from a circular shape. The anti-twist safeguard engages positively in said external cross-sectional shape, thus securing the extension arm with respect to the housing against twisting relative to the longitudinal axis.

14 Claims, 3 Drawing Sheets

(56) References Cited

U.S. PATENT DOCUMENTS

| | | | | | |
|---|---|---|---|---|---|
| 4,858,481 | A | * | 8/1989 | Abraham | 74/89.38 |
| 5,809,833 | A | * | 9/1998 | Newport et al. | 74/89.37 |
| 7,866,225 | B2 | * | 1/2011 | Oberle et al. | 74/89.37 |
| 2007/0169578 | A1 | * | 7/2007 | Christensen et al. | 74/89.37 |
| 2010/0162838 | A1 | * | 7/2010 | Hirai et al. | 74/89.33 |
| 2011/0265587 | A1 | * | 11/2011 | Schwartz et al. | 74/89.23 |

FOREIGN PATENT DOCUMENTS

| | | |
|---|---|---|
| DE | 101 28 251 A1 | 5/2002 |
| DE | 696 24 060 T2 | 10/2003 |
| DE | 10 2007 056 861 A1 | 5/2009 |
| DE | 10 2007 055 862 A1 | 6/2009 |
| DE | 10 2009 032 345 A1 | 1/2011 |
| EP | 0 767 526 A1 | 4/1997 |
| EP | 1 035 355 A1 | 9/2000 |
| FR | 2 587 690 A1 | 3/1987 |
| WO | WO 2010048942 A1 * | 5/2010 |

OTHER PUBLICATIONS

European Search Report corresponding to EP Application No. EP 12185585.2, completed Jan. 10, 2013 (German language document) (5 pages).

* cited by examiner

LINEAR MOTION DEVICE HAVING AN ANTI-TWIST SAFEGUARD, COMPRISING AN ELONGATE ANTI-FRICTION LINING

This application claims priority under 35 U.S.C. §119 to German patent application no. DE 10 2011 116 631.2, filed Oct. 20, 2011 in Germany, the disclosure of which is incorporated herein by reference in its entirety.

BACKGROUND

The disclosure relates to a linear motion device having an anti-twist safeguard, comprising an elongate anti-friction lining.

EP 0 767 526 B1 has disclosed a linear motion device in the form of an electric cylinder. According to FIG. 3 of EP 0 767 526 B1, the linear motion device 10 comprises a housing 12 and an extension arm 30, which projects from the housing. In this arrangement, the housing and the extension arm are constructed in the form of a hollow cylinder, with the extension arm being accommodated in the through bore 11 of the housing and being supported in the housing in such a way that it can move along a longitudinal axis.

The extension arm can be set in motion by means of a screw drive. The screw drive comprises a threaded spindle 24, which is supported in such a way that it can rotate relative to the longitudinal axis and is provided on the outer circumferential surface thereof with helical thread flights 22. Engaging in the thread flights is a matching threaded nut 28 which, in the case under consideration, is formed integrally with the extension arm. However, the prior art also includes electric cylinders in which the threaded nut is constructed in the form of a separate nut with recirculating spherical rolling elements, the nut being connected securely to one end of the extension arm. Rotary motion can be imparted to the threaded spindle by an electric motor 20 which, in the case under consideration, is coupled directly to the threaded spindle. However, it is also possible for a transmission, e.g. a belt or gear-type transmission, to be provided between the electric motor and the threaded spindle.

An anti-twist safeguard is furthermore provided, supporting the torque which the electric motor imposes on the threaded spindle and thus preventing the extension arm from being twisted relative to the longitudinal axis with respect to the housing. For this purpose, the extension arm is equipped substantially over the entire length thereof with splines. The housing, for its part, engages positively, by means of part 36, in the splines.

Other cross-sectional shapes for the extension arm that deviate from the circular shape are also known as substitutes for the splines. In the case of the extension arm in FR 2587690 A1, for example, three flats are provided on an initially circular hollow tube.

The disadvantage of the anti-twist safeguard according to EP 0 767 526 B1 lies in the complex production of the many grooves of the splines. However, the splines have the advantage that there is a very large engagement surface overall. Moreover, this surface is aligned substantially perpendicular to the acting forces. Wear is correspondingly low. The extension arm in FR 2587690 A1, in contrast, is significantly easier to produce. However, wear minimization would require the provision of running rollers supported in rolling contact bearings to provide the positive engagement between the housing and the extension arm. This, in turn, is very complex.

It is the object of the disclosure to specify an anti-twist safeguard which is easy to produce and is furthermore subject to little wear.

SUMMARY

According to the disclosure, this object is achieved by the fact that the anti-twist safeguard comprises at least one separate elongate anti-friction lining, which is formed with a constant cross-sectional shape, the anti-friction lining being arranged substantially without play between the housing and the securing section of the extension arm and extending transversely to the longitudinal axis. The separate anti-friction lining can be produced at low cost from a plastic which has particularly favorable anti-friction properties while having sufficiently high strength. Production by the extrusion method is a particularly suitable candidate for consideration here. Polytetrafluoroethylene (PTFE) or a blend of materials containing this material may be considered as a material, for example. The elongate shape of the anti-friction lining leads to a large area of contact between the extension arm and the anti-friction lining, ensuring that the wear which occurs there is low. The anti-friction lining, which is arranged transversely to the longitudinal axis, has a small extent in the direction of the longitudinal axis, thus ensuring that the range of movement of the linear motion device is restricted only to a small extent by the anti-twist safeguard.

The cross-sectional shape of the anti-friction lining is of substantially rectangular design. In this case, the long sides of the rectangle preferably form the anti-friction faces of the anti-friction lining, whereas the short sides of the rectangle are aligned in the direction of force transmission. The proposed rectangular shape has a large sliding surface while, at the same time, the volume of the anti-friction lining is small. Thus, only a small amount of the expensive plastics material with advantageous anti-friction properties is required. In this case, the thickness of the short sides of the rectangle is just sufficient to ensure that the anti-friction lining has adequate inherent stiffness and that it is held securely in the housing. The low thickness of the anti-friction lining results in high stiffness of the anti-twist safeguard and, furthermore, the consumption of material is particularly low.

The anti-friction lining can have a first and a second end, which lie opposite one another, thereby defining a narrow free space. The anti-friction lining therefore surrounds the extension arm almost completely. The narrow free space allows the anti-friction lining to change length due to heating up without the anti-twist safeguard becoming distorted. Moreover, the finite configuration of the anti-friction lining makes it easier to install in the housing. However, it is also possible for the anti-friction lining to surround the extension arm in an endless form, although this embodiment is not the preferred one for the reasons given above.

A plurality of substantially identical anti-friction linings can be provided, which are arranged adjacent to one another along the longitudinal axis. As a result, the sliding surface between the anti-friction lining and the extension arm can be made virtually any size without having to change the shape of the anti-friction lining itself. As a result, the same anti-friction lining can be used for linear motion devices of different sizes, and can be produced at low cost in large quantities. With a plurality of separate anti-friction linings, it is furthermore easier to ensure that the entire sliding surface provides substantially uniform support than is the case with a single large anti-friction lining.

The free spaces can be arranged in different locations when viewed in the direction of the longitudinal axis. In the region of the free spaces, the individual anti-twist safeguards do not provide support. However, the offset arrangement of the free spaces ensures that the extension arm is supported by at least one of the anti-friction linings over its entire circumference.

All the anti-friction linings can be fixed on a separate holding part. This makes the overall linear motion device easier to assemble. The device is generally very large and therefore cumbersome. The holding part, in contrast, is much smaller. The anti-friction linings and, where appropriate, further components for installation, can therefore be installed much more easily on the holding part. At the end of installation, all that is required is to secure the entire holding part with the anti-friction linings on the remainder of the linear motion device. It is furthermore possible to use an identical holding part for linear motion devices of different lengths, thus enabling the holding part to be produced in large numbers at low cost.

An end seal having at least one sealing lip surrounding the extension arm in a sealing manner can be provided, the end seal being secured on the holding part. The installation of the end seal, which is known per se, is therefore made easier in the same way as that of the anti-friction linings.

A foam wiper can be provided, which is arranged adjacent to the end seal on the side of the at least one anti-friction lining, the wiper resting on the extension arm. The wiper absorbs lubricant adhering to the extension arm and releases it to the extension arm again at unlubricated locations. This ensures that the extension arm is covered by at least a thin lubricating film where it makes sliding contact with the anti-friction linings and the end seal. The wear on the anti-friction linings and on the end seal is therefore low. The wiper is arranged adjacent to the end seal because it is there that lubricant preferentially collects and can be absorbed by the wiper.

An elongate threaded spindle can be supported in the housing in such a way that it can rotate relative to the longitudinal axis, a nut in screw engagement with the threaded spindle being secured on one longitudinal end of the extension arm. The anti-twist safeguard according to the disclosure serves primarily to support the driving torque of the threaded spindle. If the anti-twist safeguard were not present, the extension arm would be rotated relative to the longitudinal axis by the threaded spindle. There would be no longitudinal movement of the extension arm.

At least one end stop can be provided for the nut, said stop being composed of an elastomer, the end stop being secured on the holding part. An end stop for the nut composed of an elastomer is known per se. It is particularly easy to install on the holding part. To this extent, what has already been stated in relation to the anti-friction lining applies.

The end stop can be constructed in the form of a hollow cylinder which surrounds the extension arm. This results in a particularly large area of contact between the end stop and the nut, ensuring that the end stop is subject to only low loads when the nut runs against the end stop.

The housing can comprise a circular-cylindrical housing tube, the holding part being constructed in the form of a hollow cylinder, and the housing tube surrounding the holding part at least in one section or sections. As a result, the holding part is supported on a large bearing surface on the housing tube, thus making it possible to transmit a high torque there from the anti-twist safeguard to the housing. At the same time, the holding part itself can be embodied with small dimensions without having a disadvantageous effect on the stiffness of the anti-twist safeguard.

BRIEF DESCRIPTION OF THE DRAWINGS

The disclosure is explained in greater detail below with reference to the attached drawings, in which.

DETAILED DESCRIPTION

Figure 1:
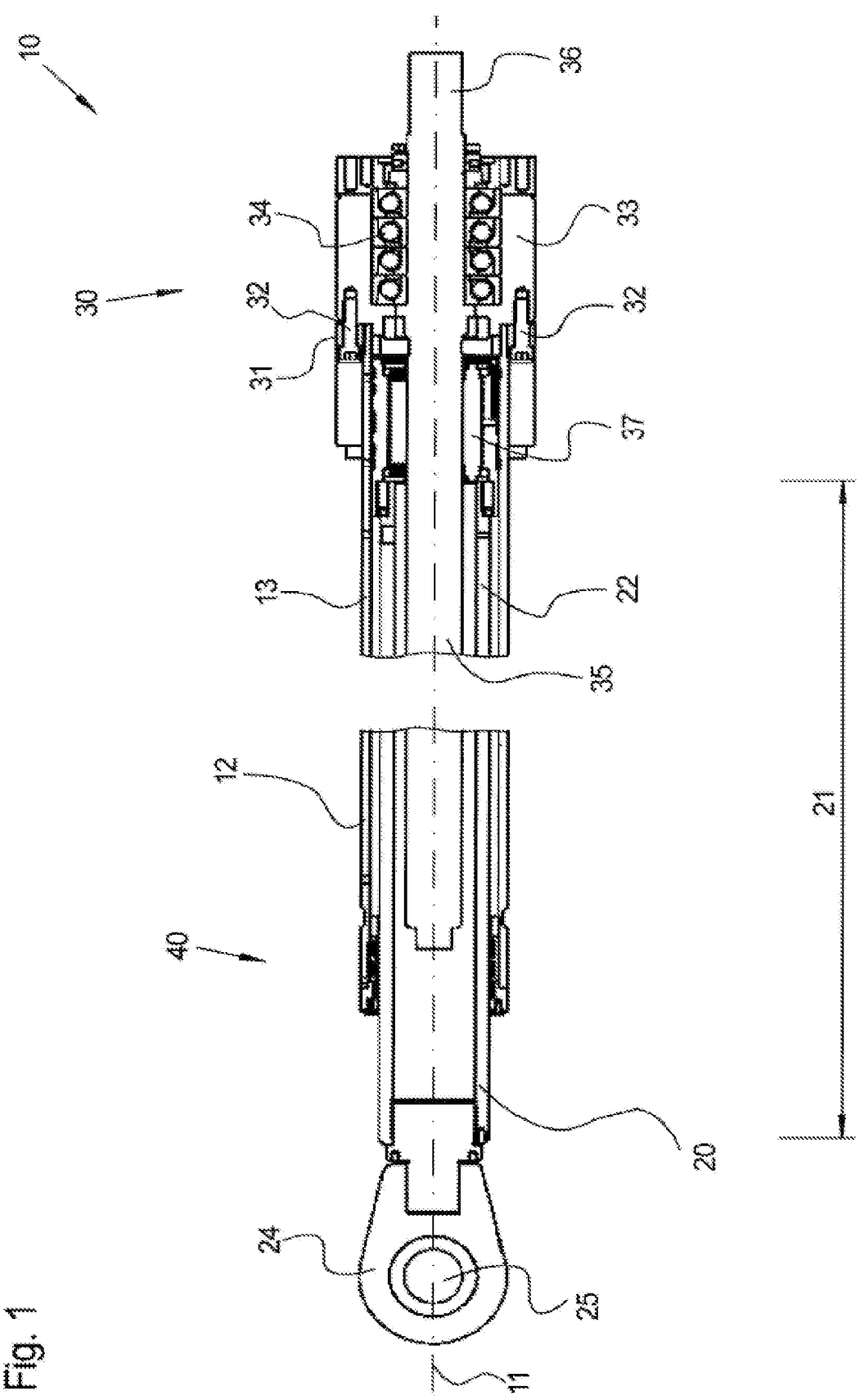
FIG. 1 shows a longitudinal section through a linear motion device according to the disclosure.

FIG. 1 shows a longitudinal section through a linear motion device 10 according to the disclosure. The linear motion device 10 comprises a housing 12 and an extension arm 20. The housing 12 comprises a housing tube 13, on one longitudinal end of which an anti-twist safeguard 40 is mounted, with a pivot bearing 30 being provided at the opposite longitudinal end. The housing tube 13 is constructed in the form of a circular hollow cylinder, being produced from steel by drawing. After the drawing process, the housing tube 13 already has sufficient accuracy for the present use and therefore requires only localized finish machining At the longitudinal end associated with the pivot bearing 30, the housing tube 13 is provided on the outer circumferential surface with an external thread, onto which a holding ring 31 is screwed. The holding ring 31, in turn, is screwed to the bearing housing 33 of the pivot bearing 30 by means of a plurality of screw bolts 32 aligned parallel to the longitudinal axis, the bearing housing 33 thus being clamped against a longitudinal end face of the housing tube 13.

The bearing housing 33 is constructed substantially in the shape of a circular hollow cylinder. Accommodated in the bearing housing 33 is a total of four angular contact ball bearings 34, in which a threaded spindle 35 is supported in such a way that it can rotate relative to the longitudinal axis 11. A circular-cylindrical drive spigot 36 of the threaded spindle 35 projects from the bearing housing 33, thus enabling it to be brought into rotary driving connection with an electric motor or a transmission, for example, in order to move the extension arm 20 in the direction of the longitudinal axis 11. Within the housing tube 13, the threaded spindle 35 is provided with thread flights extending helically with respect to the longitudinal axis 11. Engaging in said thread flights is a nut 37, which in the present embodiment is embodied as a planetary nut, which can be embodied in accordance with DE 10 2007 056 861 A1, for example. However, it is also possible to provide a nut with recirculating rolling contact elements or a sliding threaded nut.

The extension arm 20 comprises an extension arm tube 22, which extends with a constant cross-sectional shape in the direction of the longitudinal axis 11, surrounding the threaded spindle 35 in a section or sections. Depending on the length of the linear motion device 10, the end of the threaded spindle 35 which faces the pivot bearing 30 is unsupported or supported for sliding movement on the inner circumferential surface of the extension arm tube 22. The inner circumferential surface of the extension arm tube 22 is of circular-cylindrical design, the outer circumferential surface having the basic shape of a circular cylinder provided with four flats, which are arranged on the sides of a square when viewed in cross section. This circumstance is explained in greater detail with reference to FIG. 5. The outer circumferential surface of the extension arm tube 22 forms the securing section 21 of the extension arm 20. The securing section 21 is the region of the extension arm which can enter into engagement with the anti-twist safeguard 40 during the movement of the linear motion device 10. At the end facing the nut 37, the housing tube 22 is provided on the outer circumferential surface with an external thread, onto which the nut 37 is screwed. The corresponding internal thread can be provided either directly on the main body of the nut 37 or on a separate connecting part.

At the end of the extension arm tube 22 which projects from the housing 12, a fixing part 24 is provided, said part being provided with a circular-cylindrical bolt hole 25. The bolt hole is either provided in a fixed form in the fixing part 24 or is embodied in the form of a ball joint.

Instead of the bolt hole, it is also possible to provide an external thread, the center line of which coincides with the longitudinal axis 11 of the linear motion device 10.

Figure 2:
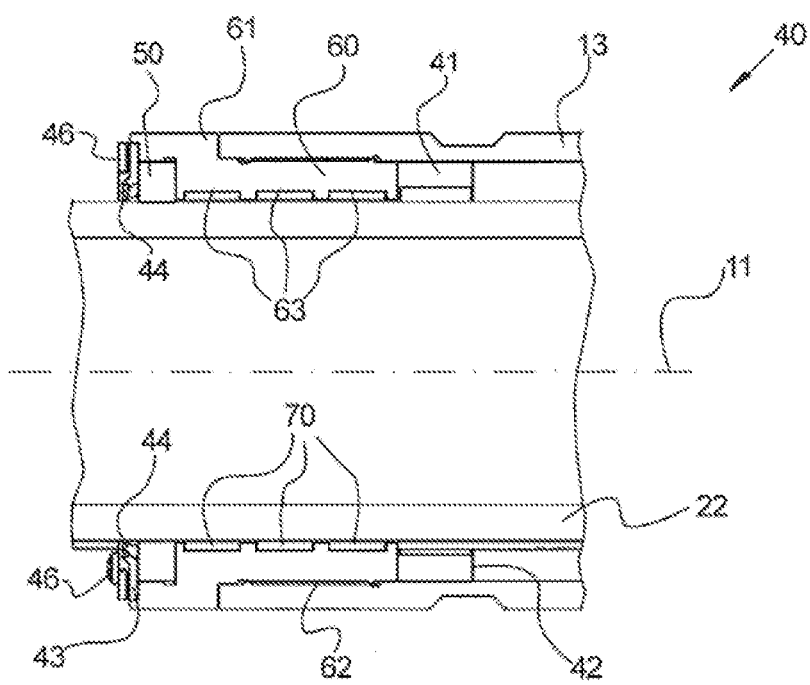
FIG. 2 shows an enlarged detail of FIG. 1 in the region of the anti-twist safeguard.

FIG. 2 shows an enlarged detail of FIG. 1 in the region of the anti-twist safeguard 40. The anti-twist safeguard 40 comprises a separate holding part 60, which is embodied substantially in the form of a circular hollow cylinder. Provided on the outer circumferential surface of the holding part 60 is an external thread 62, which is screwed into an internal thread on the inner circumferential surface of the housing tube 13, thus ensuring that the holding part 60 is securely connected to the housing tube 13. In this case, the holding part 60 rests by means of a shoulder 61 against an associated longitudinal end face of the housing tube 13. Three identical receiving recesses 63 are provided on the inner circumferential surface of the holding part 60, being arranged adjacent to one another along the longitudinal axis 11. The receiving recesses 63 surround the extension arm tube 22 in the manner of rings, the anti-friction linings 70 being accommodated in the receiving recesses, ensuring that there is substantially no play in the radial direction relative to the holding part 60 and to the extension arm tube 22. The anti-friction linings 70 have a constant rectangular cross-sectional shape, with the long side of the rectangle being about 5 times as long as the short side of the rectangle. By means of the receiving recesses 63, the anti-friction linings 70 are held positively in the direction of the longitudinal axis 11, ensuring that they do not move relative to the holding part 60 during a movement of the extension arm.

On the holding part 60, there is furthermore a separate end stop 41 composed of an elastomer. The end stop is embodied in the form of a circular ring, which has a constant rectangular cross-sectional shape. The outer circumferential surface of the end stop 41 rests with a slight preload on the inner circumferential surface of the housing tube 13. A longitudinal end face of the end stop rests against the holding part 60, with the opposing longitudinal end face forming a stop surface 42 which can enter into contact with the nut when the extension arm is extended to the maximum extent.

Also accommodated in the holding part 60 is a wiper 50, which is cut out from an open-cell sheet of foam by means of water jet cutting. The wiper 50 is held in a recess in the holding part 60 by an end seal 43. Overall, the end seal 43, which is composed of an elastomer, is of plate-shaped design, being provided with a sealing lip 44 which projects obliquely outwards and makes sealing contact with the outer circumferential surface of the extension arm tube 22. A retention plate 45 in the form of a circular ring rests on the end seal 43 and is screwed to the holding part 60 by means of a plurality of retention screws 46. By means of the rigid retention plate 45, the clamping force of the retention screws 46, which is applied at individual points, is distributed over the entire circumference of the flexible end seal 43.

Figure 3:
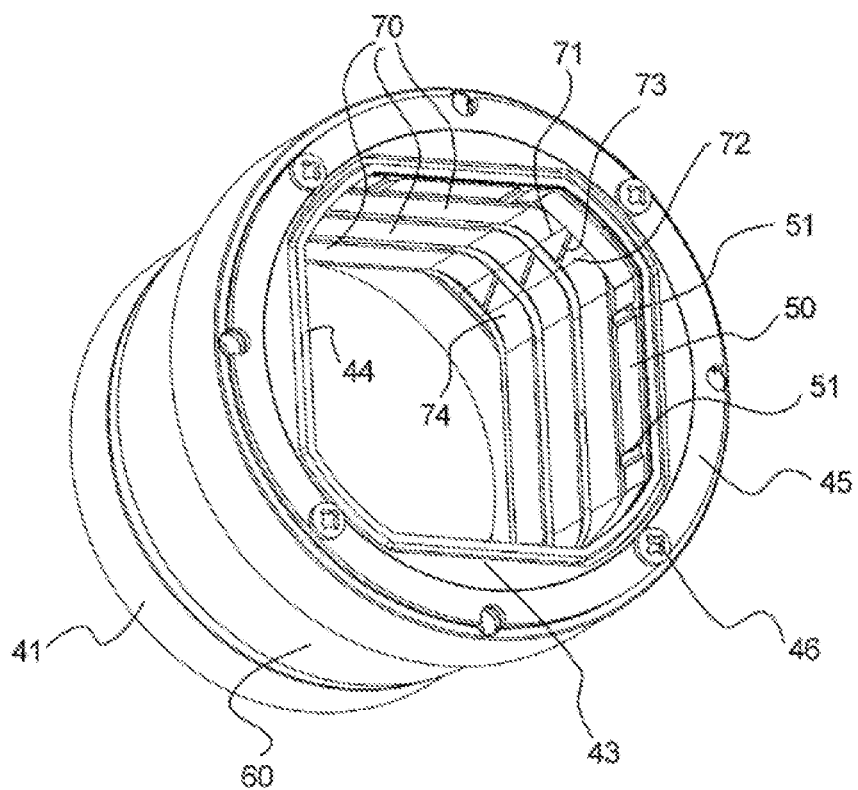
FIG. 3 shows a perspective view of the holding part.
Figure 4:
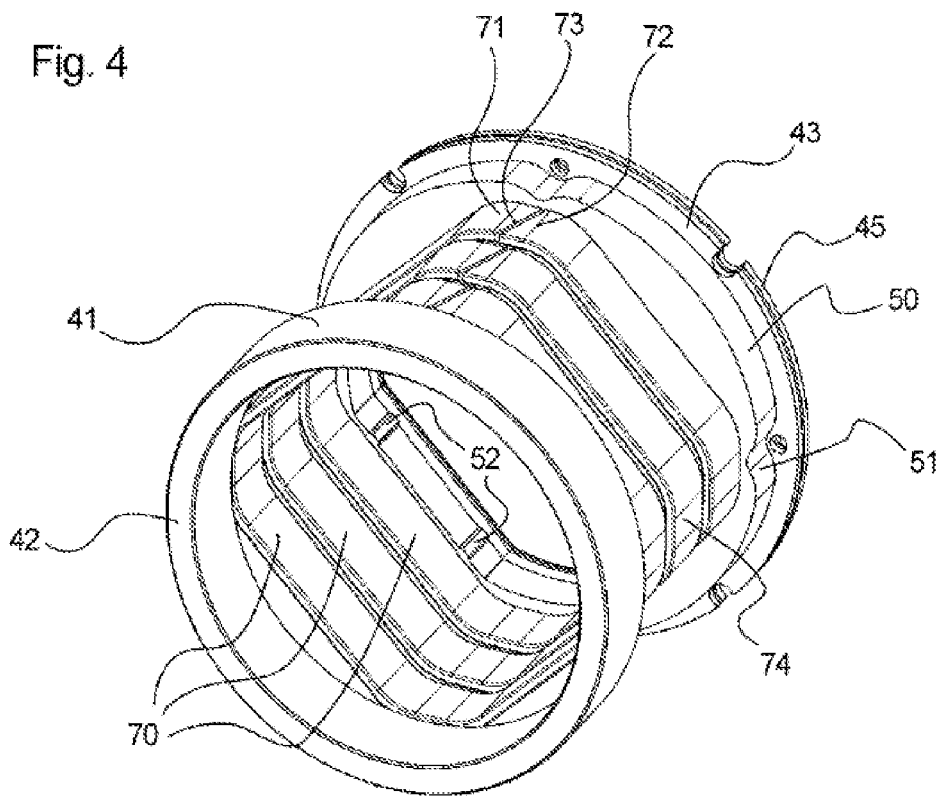
FIG. 4 shows a perspective view of the anti-friction linings; of the end seal and of the end stop without the surrounding holding part.

FIG. 3 shows a perspective view of the holding part 60. FIG. 4 shows a perspective view of the anti-friction linings 70; of the end seal 43 and of the end stop 41 without the surrounding holding part. The directions of viewing in FIGS. 3 and 4 are approximately opposite.

The anti-friction linings 70 are each embodied in the form of a plastic strip, which has a constant rectangular cross-sectional shape. The plastic strip is preferably produced by extrusion and is straight in the unworked condition while having a high bending elasticity. The plastic strip, which is produced in endless form, is cut to the desired length in order to form the anti-friction linings The opposite ends 71; 72 of the plastic strip are cut off obliquely, resulting in a free space 73 between the ends when installed. Contrary to the illustration in FIGS. 3 and 4, the free spaces are arranged in different locations when viewed in the direction of the longitudinal axis. The anti-friction linings 70 are installed in the holding part 60 along a square with rounded corners 74, with the free space 73 in each case being arranged in one of the rounded corners 74. The radius of the rounded corners 74 results from the bending elasticity of the anti-friction lining 70. The aim here is that essentially only elastic bending occurs.

The wiper 60 is embodied substantially as a circular cylinder at its outer circumferential surface, with a plurality of recesses 51 being provided to form a free space for the retention screws 46. The inner circumferential surface of the wiper 50 is substantially matched to the outer circumferential surface of the extension arm tube, with a plurality of projections 52 being provided, by means of which a defined slight contact force by the wiper 50 on the extension arm tube is established.

Figure 5:
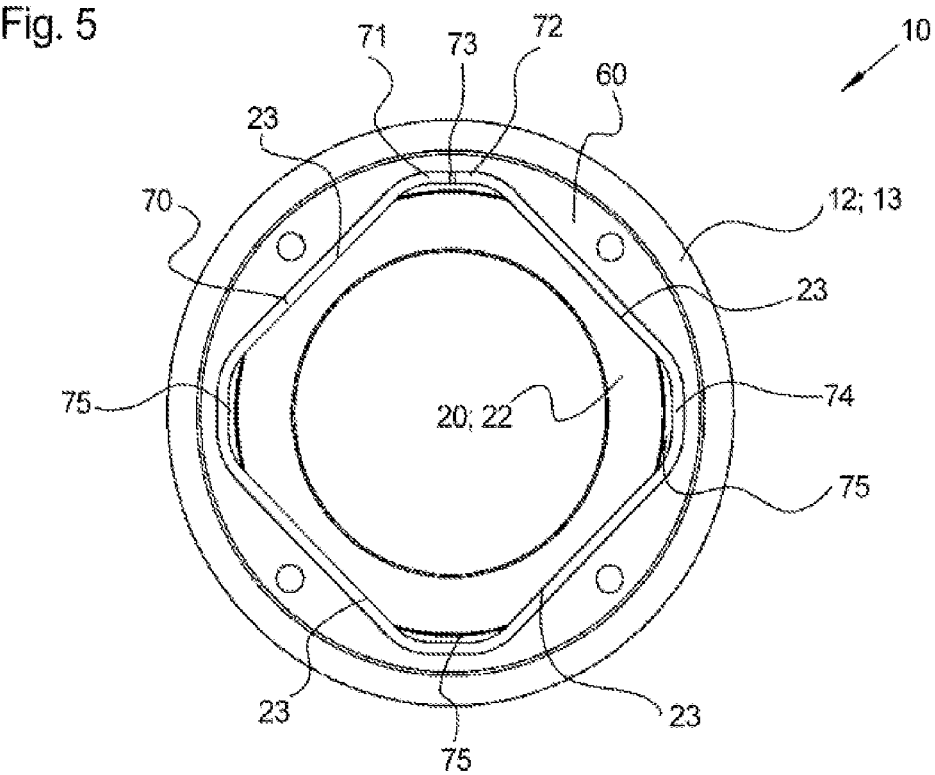
FIG. 5 shows a cross section through the linear motion device shown in FIG. 1, wherein the section plane runs through an anti-friction lining.

FIG. 5 shows a cross section through the linear motion device 10 shown in FIG. 1, with the section plane passing through an anti-friction lining 70. One particular feature of note is the difference in shape between the outer circumferential surface of the extension arm tube 22 and the bending profile of the anti-friction linings 70 in the corner regions 74. In the unworked condition, the extension arm tube 22 is in the form of a circular hollow cylinder. On this, a total of four flats 23 are produced by means of milling. The flats 23 extend parallel to the longitudinal axis and are arranged on a square when viewed in cross section. In contrast, the anti-friction lining 70 is bent into the form of a square with rounded corners 74, starting from a straight strip. Accordingly, there is a spacing 75 between the extension arm tube 22 and the anti-friction linings 70 in the corner regions, and therefore there is no force transmission there as part of the process of safeguarding against twisting. Otherwise, the anti-friction linings 70 rest substantially without play on flat surfaces of the extension arm 22 and of the holding part 60, thus ensuring that the extension arm tube is secured positively against twisting relative to the longitudinal axis with respect to the housing tube 13.

What is claimed is:

1. A linear motion device comprising:
  a housing;
  an extension arm, which projects from the housing and includes a securing section; and
  an anti-twist safeguard including at least one separate elongate anti-friction lining, which is formed with a constant cross-sectional shape, the anti-friction lining being arranged substantially without play between the housing and the securing section of the extension arm and extending transversely to a longitudinal axis,
  wherein the anti-friction lining comprises a strip having a first longitudinal end and a second longitudinal end, the strip extending longitudinally around a circumference of the extension arm to position the first longitudinal end and the second longitudinal end at positions where the first longitudinal end and the second longitudinal end are arranged facing each other and spaced apart from each other to define a free space therebetween, wherein the extension arm is supported on the housing in such a way that the extension arm is configured to move relative to the housing along the longitudinal axis, wherein in the securing section, the extension arm extends parallel to the longitudinal axis with a constant external cross-sectional shape deviating from a circular shape, and wherein the anti-twist safeguard engages positively in said external cross-sectional shape, thus securing the extension arm with respect to the housing against twisting relative to the longitudinal axis.

2. The linear motion device according to claim 1, wherein the cross-sectional shape of the anti-friction lining is of substantially rectangular design.

3. A linear motion device, comprising:
a housing;
an extension arm, which projects from the housing and includes a securing section; and
an anti-twist safeguard including at least one separate elongate anti-friction lining, which is formed with a constant cross-sectional shape, the anti-friction lining being arranged substantially without play between the housing and the securing section of the extension arm and extending transversely to a longitudinal axis,
wherein the anti-friction lining comprises a strip having a first longitudinal end and a second longitudinal end, the strip extending longitudinally around a circumference of the extension arm to position the first longitudinal end and the second longitudinal end at positions where the first longitudinal end and the second longitudinal end are arranged facing each other and spaced apart from each other to define a free space therebetween,
wherein the extension arm is supported on the housing in such a way that the extension arm is configured to move relative to the housing along the longitudinal axis,
wherein in the securing section, the extension arm extends parallel to the longitudinal axis with a constant external cross-sectional shape deviating from a circular shape,
wherein the anti-twist safeguard engages positively in said external cross-sectional shape, thus securing the extension arm with respect to the housing against twisting relative to the longitudinal axis, and
wherein the linear motion device further includes a plurality of substantially identical anti-friction linings arranged adjacent to one another along the longitudinal axis.

4. The linear motion device according to claim 3, wherein the free spaces respectively defined between the first and the second ends of each of the anti-friction linings are arranged in different locations when viewed in the direction of the longitudinal axis.

5. The linear motion device according to claim 3, wherein all the anti-friction linings are fixed on a separate holding part.

6. The linear motion device according to claim 5, further comprising:
an end seal having at least one sealing lip surrounding the extension arm in a sealing manner, the end seal being secured on the separate holding part.

7. The linear motion device according to claim 6, further comprising:

a foam wiper arranged adjacent to the end seal on the side of the at least one anti-friction lining, the foam wiper resting on the extension arm.

8. The linear motion device according to claim 5, further comprising:
an elongate threaded spindle supported in the housing in such a way that the threaded spindle is configured to rotate relative to the longitudinal axis; and
a nut in screw engagement with the threaded spindle and being secured on one longitudinal end of the extension arm.

9. The linear motion device according to claim 8, further comprising:
at least one end stop for the nut, said at least one end stop being composed of an elastomer, the at least one end stop being secured on the holding part.

10. The linear motion device according to claim 9, wherein the at least one end stop is constructed in the form of a hollow cylinder which surrounds the extension arm.

11. The linear motion device according to claim 5, wherein:
the housing includes a circular-cylindrical housing tube,
the holding part is constructed in the form of a hollow cylinder, and
the housing tube surrounds the holding part at least in one section or sections.

12. The linear motion device according to claim 1, wherein the free space is sized to accommodate expansion of the anti-friction lining about the longitudinal axis from a first length of the anti-friction lining to a second length of the anti-friction lining without contact between the first end and the second end.

13. The linear motion device according to claim 12, wherein the first end and the second end are positioned nearly adjacent to one another when the anti-friction lining is expanded to the second length.

14. A linear motion device with an elongated extension arm configured to move along a longitudinal axis, the extension arm having a constant external cross-sectional shape deviating from a circular shape, the linear motion device comprising:
a housing; and
an anti-twist safeguard including a separate lining element, the separate lining element comprising a strip formed with a constant cross-sectional shape and having a first and second longitudinal end, the strip extending longitudinally around a circumference of the extension arm to position the first and second longitudinal ends with respective end faces of the first and second longitudinal ends arranged facing each other and spaced apart from each other to define a circumferential gap therebetween, the lining element being arranged substantially without play within the housing and extending circumferentially about the longitudinal axis,
wherein the anti-twist safeguard engages positively in the external cross-sectional shape so as to (i) secure the extension arm with respect to the housing against twisting relative to the longitudinal axis and (ii) allow the extension arm to move relative to the housing along the longitudinal axis.

* * * * *